United States Patent

Ennis et al.

[11] Patent Number: 6,052,046
[45] Date of Patent: Apr. 18, 2000

[54] MINIATURIZED DOUBLE POLE CIRCUIT BREAKER WITH ARC FAULT AND GROUND FAULT PROTECTION

[75] Inventors: Ralph Mason Ennis, Imperial; Thomas Michael Doring, Wexford, both of Pa.

[73] Assignee: Eaton Corporation, Cleveland, Ohio

[21] Appl. No.: 09/122,600

[22] Filed: Jul. 24, 1998

[51] Int. Cl.[7] .................................................. H01H 73/00
[52] U.S. Cl. .................................. 335/202; 335/6; 335/8; 335/11
[58] Field of Search .................................. 335/18, 8–10, 335/202; 361/42–51, 6

[56] References Cited

U.S. PATENT DOCUMENTS

| | | | |
|---|---|---|---|
| 5,414,395 | 5/1995 | Garnto et al. | 335/18 |
| 5,453,723 | 9/1995 | Fello et al. | 335/18 |
| 5,477,201 | 12/1995 | Garnto et al. | 335/18 |
| 5,483,211 | 1/1996 | Carrodus et al. | 335/18 |
| 5,825,598 | 10/1998 | Dickens et al. | 361/42 |

*Primary Examiner*—Michael L. Gellner
*Assistant Examiner*—Raymond Barrera
*Attorney, Agent, or Firm*—Martin J. Moran

[57] ABSTRACT

A two pole circuit breaker having arc fault and ground fault protection circuits, in addition to a standard thermal-magnetic trip units, that is designed to fit in a standard knock-out, three-quarter inch or one-inch, of a circuit breaker load center panel. The circuit breaker is divided into three compartments with two side-by-side compartments housing the electro-magnetic trip mechanism respectively for each pole, and a third compartment in tandem with the other two for housing the electronics associated with the ground fault and arc fault protection circuits. The circuit breaker spans the area allocated to a single knock-out with portions of the electro-magnetic trip compartments seated within the knock-out opening and with the third compartment hidden behind the panel.

12 Claims, 1 Drawing Sheet

MINIATURIZED DOUBLE POLE CIRCUIT BREAKER WITH ARC FAULT AND GROUND FAULT PROTECTION

BACKGROUND OF THE INVENTION

1. Field of the Invention

This invention relates to apparatus for providing protection in electrical power distribution systems, and more particularly, to miniaturized two pole circuit breakers for providing protection for arc faults and ground faults, that are capable of being mounted in a single standard three-quarter inch or one-inch slot of a load center panel.

2. Background of the Information

There has been an increased interest in providing protection for arc faults as well as ground faults in load centers without the need for increasing the size of load center panels. Arc faults are intermittent high impedance faults which can be caused, for instance, by worn insulation, loose connections, broken conductors, and the like. Because of their intermittent and high impedance nature, they do not generate currents of sufficient instantaneous magnitude or sufficient average current to trigger the thermal-magnetic trip device which provides the short circuit and overcurrent protection. Various types of arc fault detectors have been proposed, but except for the circuit described in U.S. Pat. No. 5,889,643 issued Mar. 3, 1999, such detectors have not been adapted in miniaturized form so they can fit into common load center panels having three-quarter inch or one-inch slots. A further need exists for an arc fault breaker in a two pole design that can fit within a single slot within a load center panel.

SUMMARY OF THE INVENTION

These and other needs are satisfied by the invention which is directed to an apparatus for detecting faults in multiple circuits which is capable of fitting within a load center three-quarter inch or one-inch knock-out panel. The invention includes a two pole circuit breaker (providing standard circuit protection) having a first pole connected to interrupt current in a first line conductor and a second pole connected to interrupt current simultaneously in a second line conductor. The apparatus further includes fault detection circuitry including a first arc fault detector connected to detect arc currents between the first line conductor and neutral/or ground and to generate a trip signal in response thereto, and a second arc fault detector connected to detect arc currents between the second line conductor and neutral/or ground and to generate a trip signal in response thereto, and a ground fault detector connected to detect ground faults between each of the line conductors and ground. The apparatus also includes a conventional thermal-magnetic trip mechanism and means responsive to each of the trip signals to trip the two pole circuit breaker.

Preferably, the thermal-magnetic trip unit for each pole is placed in side-by-side insulated compartments having a combined size substantially equal to a standard three-quarter inch circuit breaker case and having a face designed to protrude through the standard three-quarter inch load center panel knock-outs; or alternatively, the standard one-inch load center panel knock-outs. The electronic processing circuits for the ground fault and arc fault detection circuits are maintained within a separate third compartment that extends in tandem with the first two compartments of the breaker that has a relatively flat upper surface below the raised portion that fits through the panel knock-out, so the electronic portion of the housing is hidden behind the load center panel. In this manner, a two pole full service breaker can be accommodated in the area allocated to a single load center panel knock-out.

BRIEF DESCRIPTION OF THE DRAWINGS

The foregoing features will be more fully appreciated in view of an illustrative example thereof taken in conjunction with the accompanying drawings of which.

DESCRIPTION OF THE PREFERRED EMBODIMENTS

Figure 1:
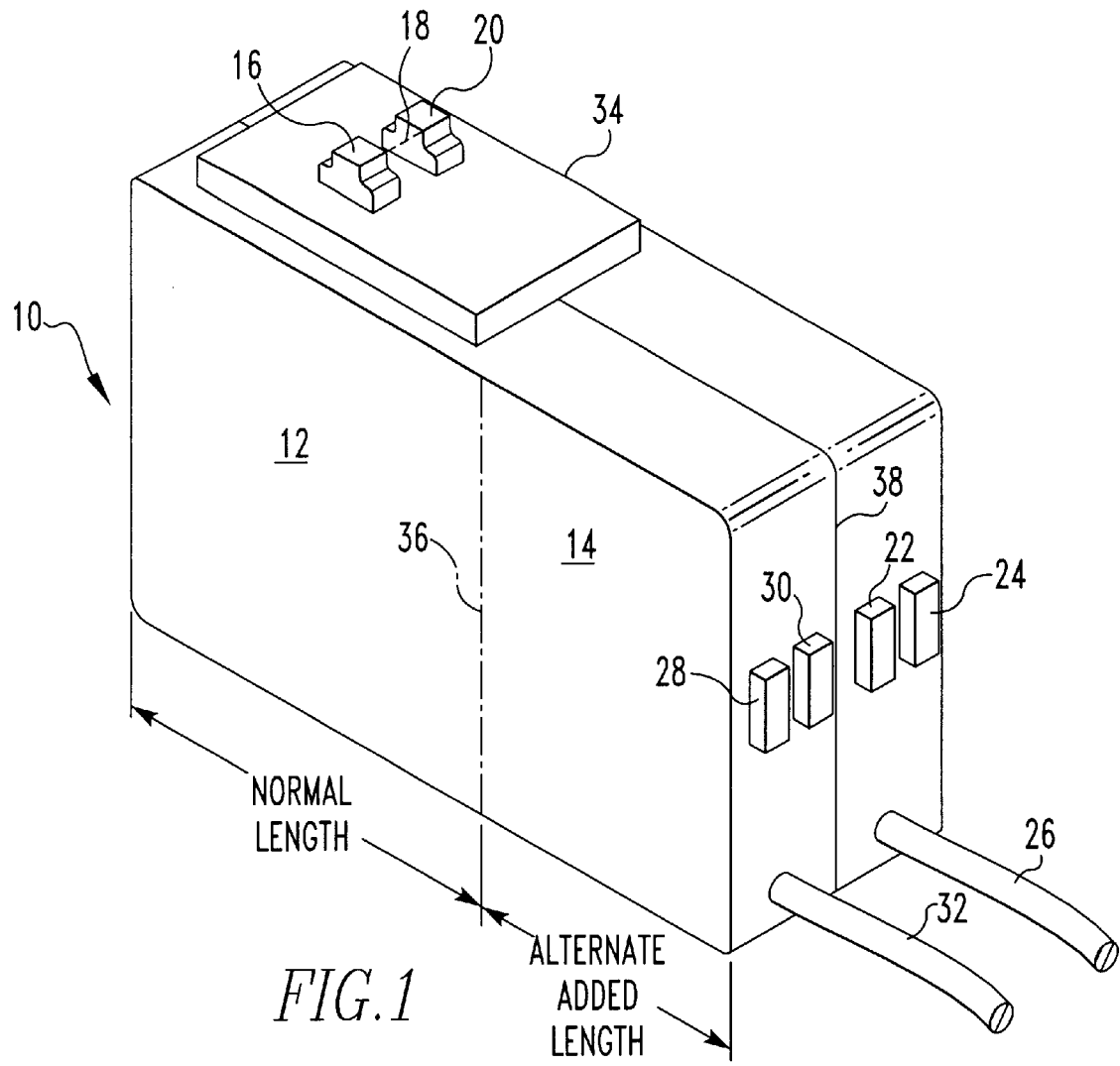
FIG. 1 is a perspective view of a circuit breaker housing constructed in accordance with this invention.

FIG. 1 illustrates a circuit breaker housing 10 constructed in accordance with this invention. The housing 10 forms two general interior compartments 12 and 14. The compartments 12 and 14 together are sized to fit within the space within a load center allocable to a single three-quarter inch or one-inch panel knock-out, as the case may be. The compartment 12 is further subdivided in the center longitudinally, from front to back, with electrical insulation. Each of the sub-compartments 12 houses the thermal-magnetic trip mechanism of the circuit breaker for each pole, which is well-known in the art. The handles for each mechanism, 16 and 20, protrude through corresponding openings in the breaker casing 10 through the raised surface 34 on top of the breaker and, in some applications, are tied together by a handle link 18 shown in dotted form. Each pole can be reset by using the switch levers 16 and 20 which happen simultaneously when the levers 16 and 20 are tied together by the handle link 18. Where a common neutral conductor is employed, it is important that both poles are disconnected simultaneously. If a common neutral conductor is not employed it is not necessary to link the switch levers 16 and 20 and the poles can be activated separately. Though not shown, a male clip is provided under the housing 12 for each pole to connect the hot side of the line respectively for phases A and B, as is well known. A female clip is also provided on the underside of the breaker and aligned to connect to the line ground in the back panel of the load center. The phase A load wiring is connected to terminal 22, the phase A neutral wire is connected to terminal 24 and the phase A ground connection is made through pigtail 26. The phase B load connection is coupled to terminal 28, the phase B neutral connection is coupled to terminal 30 and the phase B ground fault connection is made through pigtail 32.

The second compartment 14, which is placed in tandem with the compartments 12, houses the electronics for the ground fault detection circuit and the arc fault detection circuit. The electronics and the operation of the fault detection circuits can be better appreciated by reference to co-pending application Ser. No. 08/939,263 now U.S. Pat. No. 5,889,643, issued Mar. 30, 1998. Preferably, electrical shielding is provided between the housings 12, and 14 so that any arcing that occurs within compartments 12 does not affect the electronics housed in compartment 14. In some cases it may be desirable to also partition compartment 14 along its longitudinal length in line with the partition to compartments 12. Compartment 12 on its upper surface is provided with a raised portion 34 that is sized to fit within the load center panel knock-out. The remainder of the breaker seats behind the load center panel and is not observable by the user once the panel is placed in position.

Thus, the housing of this invention permits a two pole breaker having arc fault and ground fault trip capability to be seated within a standard three-quarter inch or one-inch breaker panel in a manner that enables the electronics to be shielded from arcs generated within the thermal-magnetic trip mechanism portion of the housing while only occupying the space allocated to one panel knock-out position.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A multi-pole circuit interrupter that fits within a load center panel having standard knockouts through a front panel through which a part of the load center's circuit breakers protrude wherein the circuit interrupter is enclosed within a case divided into a plurality of compartments with the compartments arranged in tandem and insulated from each other, a first of the compartments housing all the components of the thermal-magnetic trip mechanism of the circuit interrupter and a second of the compartments housing electronics associated with the functional operation of the circuit interrupter, wherein the first compartment is divided into at least two subcompartments that are insulated from each other, one for each pole, and the circuit interrupter has a width that fits within an allocated area within the load center associated with a single knockout.

2. The circuit interrupter of claim 1 wherein the second compartment substantially spans the first compartment's side that it interfaces with.

3. The circuit interrupter of claim 1 wherein the mechanical components include a thermal-magnetic trip mechanism.

4. The circuit interrupter of claim 1 wherein the second compartment is completely concealed by the load center panel when the circuit interrupter is installed in a load center.

5. The circuit interrupter of claim 1 including a load and a neutral connection positioned on the outside of the second compartment on the end opposite the interface with the first compartment.

6. The circuit interrupter of claim 5 including a pigtail, for connection to ground, extending out of the second compartment proximate to the side supporting the load and neutral connections.

7. The circuit interrupter of claim 1 where the subcompartments of the first compartment respectively house the mechanical components for the individual poles and the second compartment houses the electronics associated with both poles.

8. The circuit interrupter of claim 7 wherein the electronics monitor ground fault and arc fault conditions.

9. The circuit interrupter of claim 7 wherein the second compartment is partitioned into a first and a second subcompartment, one for each pole.

10. The circuit interrupter of claim 7 wherein the first and second compartments are insulated from each other.

11. The circuit interrupter of claim 7 including a load and a neutral connection positioned on the outside of the second compartment on the end opposite the interface with the first compartment.

12. The circuit interrupter of claim 11 including a first and second pigtail for connection to ground, one for each pole, extending out of the second compartment proximate to the side supporting the load and neutral connections.

* * * * *